March 29, 1955    E. R. SWANN    2,705,054
RIM STRUCTURE FOR SUCTION CLEANER FILTER MEMBERS
Filed Jan. 2, 1952    3 Sheets-Sheet 1

INVENTOR.
Edward R. Swann
BY Alfred H. Gross
ATTORNEY.

March 29, 1955 E. R. SWANN 2,705,054
RIM STRUCTURE FOR SUCTION CLEANER FILTER MEMBERS
Filed Jan. 2, 1952 3 Sheets-Sheet 2

INVENTOR.
Edward R. Swann
BY Alfred J. Gross
ATTORNEY.

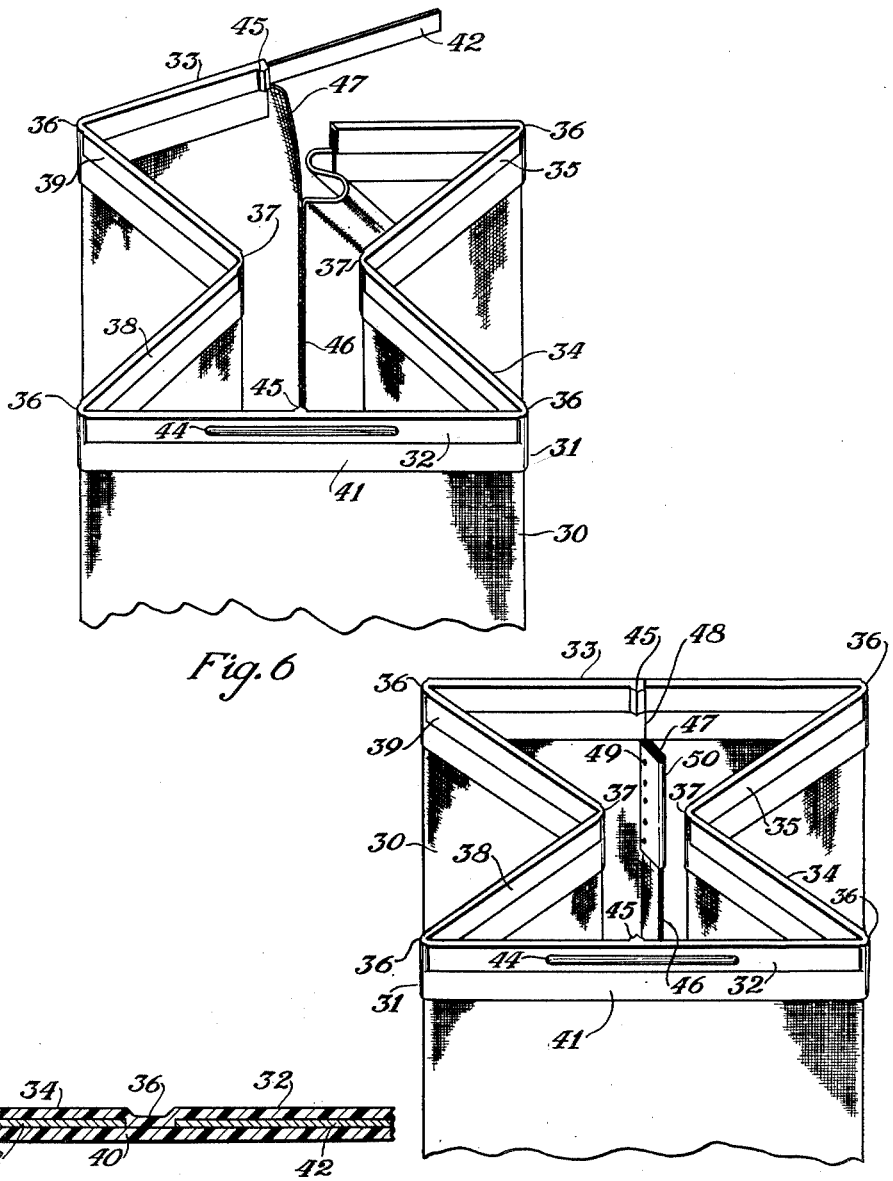

United States Patent Office 2,705,054
Patented Mar. 29, 1955

2,705,054

RIM STRUCTURE FOR SUCTION CLEANER FILTER MEMBERS

Edward Russell Swann, North Canton, Ohio, assignor to The Hoover Company, North Canton, Ohio, a corporation of Ohio Application January 2, 1952, Serial No. 264,508

4 Claims. (Cl. 183—51)

The invention disclosed and claimed herein is an improvement over the invention disclosed and claimed in the application of Frank A. Martin and Melvin H. Ripple disclosed and claimed in application Serial No. 222,784, filed April 25, 1951, now Patent Number 2,637,410, issued May 5, 1953, for "Filter Structure for Suction Cleaning Apparatus" and assigned to the assignee of this application.

The present invention relates to filter structures for use in suction cleaning apparatuses and in particular to an arrangement providing a decorative, reinforcing and sealing rim for the end of the filter normally not connected directly to the suction cleaning apparatus which will open automatically to a large extent when removed from the cleaner to provide ready emptying of accumulated debris.

It is a particular object of the present invention to provide a suction cleaner filter having an open emptying mouth bonded to a plastic rim which is foldable into a flat assembly which seals the end of the filter and which is so constructed as to be biased to open the same for emptying purposes. It is a further object of the present invention to provide a suction cleaner filter having an open end bonded to a plastic rim structure consisting of a pair of opposed side rails connected at their ends by a pair of hinged leaf members having plastic hinges therebetween and at their junction with the side rail members so arranged as normally to be biased slightly inwardly towards each other so that a slight pressure applied to the side rails will fold the entire rim structure into a flat assembly.

Other objects and advantages of the invention will become apparent as the description proceeds when taken in connection with the accompanying drawing, in which:

Figure 6 is a view of the modification of Figure 5 showing the bag mouth in open condition with the sealing rail structure partly assembled thereto;

Figure 7 is a view similar to Figure 6 showing the complete assembled condition of the filter and end sealing structure; and Figure 8 is a sectional view of a portion of the rail structure of the modification of Figure 5 showing the manner in which the hinges are formed therein.

Figure 1:
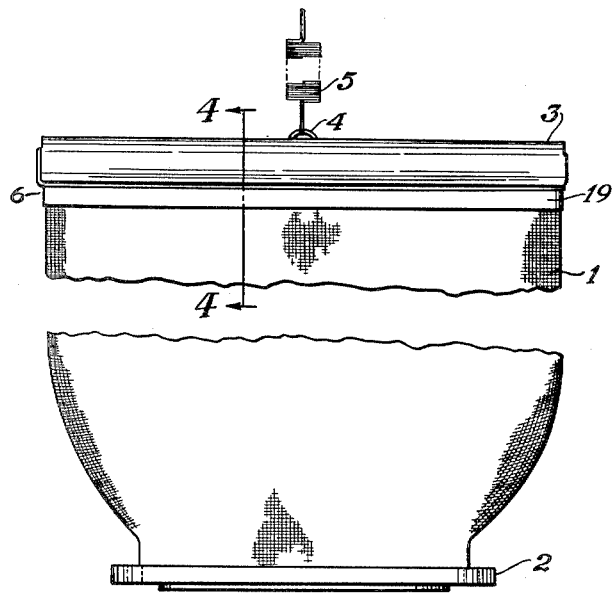
Figure 1 is an elevational view of a suction cleaner filter embodying my invention.

Referring now to the drawing in detail and first to Figure 1 thereof, there is shown a tubular suction cleaner filter 1 of textile fabric, for example, having a fitting 2 of any desired type secured to its lower end for the purpose of attaching the filter to the exhaust outlet of a suction cleaner. The upper end of the filter is carried by a channel-shaped spring clip member 3 having an attaching hook 4 secured to a supporting spring 5 which will be suitably attached to the propelling handle of the suction cleaner in use of the device.

The upper or emptying mouth end of the filter is secured in a manner to be described hereinafter to an end closure rim 6 of plastic or similar material.

Figure 2:
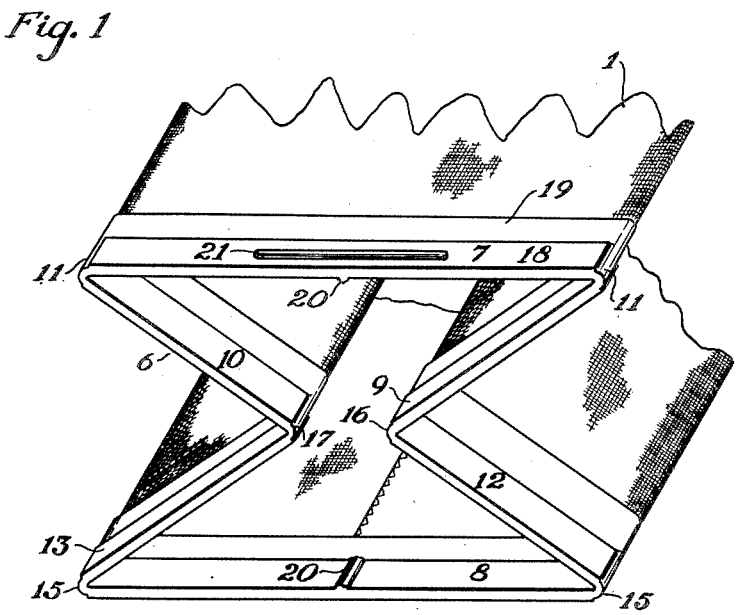
Figure 2 is a perspective view of the emptying end of a filter showing the sealing rim.
Figure 3:
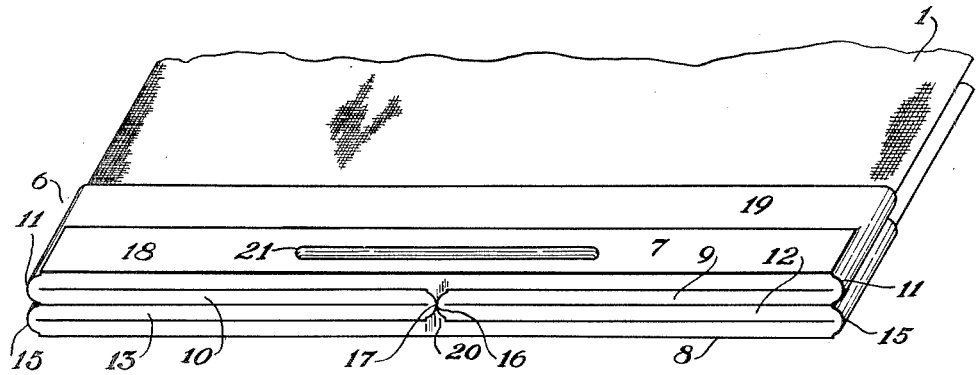
Figure 3 is a view similar to Figure 2 showing the folded condition of the filter mouth.

The rim 6 consists of a pair of opposed semi-rigid rail sections 7 and 8. The opposite ends of rail 7 are joined to right and left hand semi-rigid hinge leaves 9 and 10, respectively, by thin plastic webs 11 forming hinges. The right and left hand ends of the side rail 8 are joined to semi-rigid hinge leaves 12 and 13, respectively, by thin plastic webs 15 forming hinges. The free ends of the hinge leaves 9 and 12 are joined by a thin plastic web 16 forming a hinge and the free end portions of the hinge leaves 10 and 13 are joined by thin plastic web 17 forming a hinge. As shown more clearly in Figure 4, each of the side rails and hinge leaf sections are identical in cross section and consist of a thickened rigid outer portion 18 joined to a split or slotted and narrowed skirt portion 19. The split skirt 19 is continuous around the rim 6. The rim structure 6 is preferably molded to assume substantially the configuration shown in Figure 2 which pre-sets the hinges 11, 15, 16 and 17 so that inwardly directed pressure applied to the outer surfaces of the side rails 7 and 8 will cause the hinge leaf portions 9, 10, 12 and 13 to fold inwardly between the side rails to form a flat sealing structure as shown in Figure 3. The inner face of the thickened section 18 of each side rail is provided with an inwardly directed protuberance 20 adapted to fit against the infolded ends of the hinges 16 and 17 to form a complete air seal at this point, as shown in Figure 3. The outer surface of each side rail is provided with a raised bead 21 to form a gripping member to prevent the assembled and flattened rim structure 6 from slipping through the spring clip 3. The folded flattened rim structure, as shown in Figure 3, is inserted into the spring clip by sliding the same endways thereinto.

The free mouth end of the filter fabric 1 is inserted into the slotted portion of the skirt 19, after which the assembled rim 6 and bag 1 are placed in a heat treating fixture which heat-seals the plastic to the fabric, firmly anchoring the fabric to the rim 6 and forming a complete air sealed structure at this point. The heat-sealing operation welds the two sections of the skirt 19 together through the fabric of the filter bag 1 which converts these parts into a one-piece laminate which provides a firm bond between the bag and rim and has a neat and pleasing appearance. The term "heat-sealed" is used herein in the specification and claims to mean the above described type of fusing operation and the bond produced thereby.

Figures 4, 5:
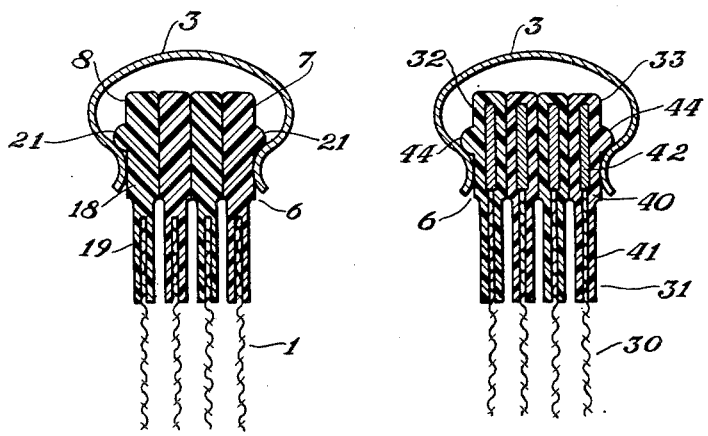
Figure 4 is a sectional view taken along the line 4—4 of Figure 1 and looking in the direction of the arrows.
Figure 5 is a view similar to Figure 4 showing a modified form of the invention.

With the rim 6 folded into the position of Figure 3, the emptying end of the filter sack is completely sealed by smooth plastic surfaces engaging each other and forcibly held in this position by the clip 3 when the clip and bag rim are assembled as shown in Figure 4. If the bag rim is opened to a greater degree than indicated in Figure 2, the inherent tension in the various thin section hinges tends to return the same to that position. Similarly, as soon as the clip 3 is removed from the assembly of Figure 4, the rim tends automatically to open the mouth of the bag to the extent shown in Figure 2 so as to facilitate emptying thereof.

The foregoing construction is productive of a particularly strong, tightly sealing, and neat appearing filter structure. By embedding the end of the filter fabric in the split skirt 19 of the various hinge frame parts and heat-sealing the bag thereto, all sewing at the upper end of the bag is eliminated and the heat-seal between the bag fabric and plastic provides a strong bond which also effectively prevents loosening of threads and other similar types of injury to the bag fabric at the end of the filter.

Referring now to Figures 5 to 8, inclusive, a modified form of the invention is illustrated which is adapted for filters which are usbjected to particularly rough usage.

The filter fabric 30 is secured, in a manner to be described hereinafter, to a rim structure 31. The rim structure 31 includes a side rail 32 and an opposed split side rail 33. The rails 32 and 33 are connected at their right hand ends, as viewed in Figure 6, by thin section hinges 36 to hinge leaf members 34 and 35, respectively, which are joined together by a thin section hinge 37. Similarly, the left hand ends of the rails 32 and 33 are joined by hinges 36 to hinge leaves 38 and 39, respectively, which are joined by a hinge 37.

The rim 31, see Figure 5, comprises a hollow body portion 40 joined to a split or slotted thin section skirt 41 which provides access to the interior of the body 40 for insertion of metal or fiber re-inforcing bars 42 which stiffen the side rails and hinge leaves between the thin section hinges. The rim 31 includes beads 44 and protuberances 45 corresponding to the members 21 and 20, respectively, of Figure 3.

The rim 31 is preferably an extruded product which issues from an extruding die in a continuous strip which is cut into lengths each sufficient to form a filter rim. The protuberances 45 and beads 44 are bonded to the rim 31 at appropriate points by a cementing or heat-sealing operation as desired. The reinforcing strips are next inserted into the hollow body in spaced relation to form the rail 32, hinge leaves 34, 35, 38 and 39 and one half the rail 33, leaving a protruding portion of one strip 42 as shown in Figure 6. The filter bag 30 is sewn into a tubular member by a seam 46 which terminates short of the bag end a distance slightly greater than one-half the length of the rail 33. The end of the filter is inserted into the slot in the skirt 41 and the parts are placed on a forming die, in the position shown in Figure 6, the skirt 41 is heat-sealed to the end of the bag fabric, and the hinges 36 and 37 are formed by pressing one wall of the body 40 across the interior opening therein to bond the same to the opposite wall of the body 40 as shown in Figure 8. This process firmly bonds the rim 31 to the bag fabric and entraps all the re-enforcing members 42 except the re-enforcing member for the rail 32 which is left protruding as shown in Figure 6. The hinge structure is shown in Figure 8 with the rail 32 and leaf 34 aligned to show the offsetting of one side of the member 40 clearly. Actually, the hinges are formed while the parts are positioned as shown in Figure 6 to pre-set the hinges to bias the parts to the Figure 6 position. The unstitched portions 47 of the bag fabric extending beyond the ends of the split portion of the skirt 41 on the rail 33 are cut back to terminate flush with the rail ends to the level of the inner end of the skirt 41. The re-enforcing strip 42 is inserted in the right hand section of the rail 33 and the abutting portions of the two halves of the rail 33 are bonded together, as shown at 48 in Figure 7, by cementing or heat-sealing as desired. The unstitched portion 47 of the filter 30 is next secured by a metallic clip 50 which may be anchored to the bag fabric by rivets 49 as shown or by cement, outstruck tangs or other suitable means.

The construction of Figures 5 to 8 is more complicated than that of Figures 1 to 4 but it is also much stronger and has the advantage that the bag fabric need not be sewn accurately into tubular shape to avoid wrinkles therein as the tolerance is easily taken up by the spring clip 50.

The construction of the reinforced rim of Figures 5 and 6 can also be made from a molded rim in which case it is not necessary to mold the rail 33 into parts. If this is done, the bag fabric is sewn rather accurately to the very end of the bag fabric as is true of the Figure 1 form of the invention and the spring clip 50 is eliminated. If the rim 31 is molded, the hinges 36 and 37 are formed in the molding process, and the various re-enforcing strips 42 are inserted in their proper position in the web 40 before the bag mouth is threaded into the slot in the skirt 41. After these operations are performed, the skirt 41 is heat-sealed to the bag fabric as before, forming the complete filter and sealing mouth assembly. If the rim 31 is molded, the bead 44 and protuberances 45 will preferably be molded integrally therewith.

While the invention has been illustrated and described in detail herein, it is not to be limited thereto but various changes may be made in the construction, design and arrangement of the parts without departing from the spirit of the invention or the scope of the appended claims.

I claim:

1. In a filter for suction cleaners, a filter member formed into a tubular body by a longitudinal seam terminating short of one end thereof, a one-piece plastic frame having a peripheral dimension less than the peripheral extent of said one end of said tubular filter member, said plastic frame including a flexible skirt portion bonded to said one end of said filter member with the excess peripheral material of said filter member removed to a depth equal to the depth of the bond between said filter member and said skirt on each side of the axis of said seam, a clip on the inside of said tubular member engaging and clamping the unsecured edges of said filter member between the end of said seam and said skirt, said plastic frame comprising a plurality of elongated frame members and flexible plastic webs joining said elongated frame members and forming hinges therebetween, said frame members being dimensioned to fold together about said webs to close and seal said one end of said tubular body.

2. In a filter for suction cleaners a tubular body of filter fabric having an open end, a one-piece plastic mouth frame having an integral flexible plastic skirt portion projecting therefrom and bonded by heat sealing to the open end portion of the tubular filter around the periphery thereof with the mouth frame projecting axially beyond the skirt and bonded open end portion of the tubular filter material, the said frame including a plurality of elongated hollow frame sections enclosing stiffening strips in the hollow portions thereof constructed from material having greater rigidity than said plastic material to stiffen the frame sections and relatively flexible hinge-forming plastic webs joining the ends of the frame sections to form a closed polygonal frame, the frame sections being dimensioned to fold about the flexible hinge-forming webs to bring the inside faces thereof into engagement with each other whereby the folded frame sections close and seal the open end of the tubular filter material and provide a multi-layered flat elongated end and mounting structure for the filter from which the flexible skirt may flare outwardly when the filter is inflated in use.

3. In a filter for suction cleaners a tubular body of filter fabric having an open end, a one-piece plastic mouth frame having a pair of integral spaced parallel plastic bands projecting therefrom forming a flexible skirt with the open end portion of the tubular filter received between the flexible bands and heat sealed thereto with the mouth frame projecting axially beyond the skirt and heat sealed open end portion of the tubular filter material, the said frame including a plurality of elongated hollow frame sections enclosing stiffening strips in the hollow portions thereof constructed from material having greater rigidity than said plastic material to stiffen the frame sections and relatively flexible hinge-forming plastic webs joining the ends of the frame sections to form a closed polygonal frame, the frame sections being dimensioned to fold about the flexible hinge-forming webs to bring the inside faces thereof into engagement with each other whereby the folded frame sections close and seal the open end of the tubular filter material and provide a multi-layered flat elongated end and mounting structure for the filter from which the flexible skirt may flare outwardly when the filter is inflated in use.

4. Apparatus according to claim 3 in which the hollow portions of the frame communicate with the space between the flexible bands and the rigid members positioned in the hollow portions of the frame are entrapped therein by the heat sealed bond between the flexible bands and open end portion of the filter fabric.

References Cited in the file of this patent

UNITED STATES PATENTS

| | | |
|---|---|---|
| 1,513,395 | Holmes | Oct. 28, 1924 |
| 1,753,458 | Willis | Apr. 8, 1930 |
| 1,787,224 | White | Dec. 30, 1930 |
| 2,308,682 | Fage | Jan. 19, 1943 |
| 2,514,750 | Dobbs et al. | July 11, 1950 |
| 2,585,214 | Belmont | Feb. 12, 1952 |
| 2,637,410 | Martin et al. | May 5, 1953 |